United States Patent
Laricchia et al.

(10) Patent No.: US 9,718,712 B2
(45) Date of Patent: Aug. 1, 2017

(54) METHODS AND SYSTEMS FOR TREATING CAUSTIC MATERIALS

(71) Applicant: UOP LLC, Des Plaines, IL (US)

(72) Inventors: Luigi Laricchia, Arlington Heights, IL (US); Javier Rios, Montgomery, IL (US)

(73) Assignee: UOP LLC, Des Plaines, IL (US)

( * ) Notice: Subject to any disclaimer, the term of this patent is extended or adjusted under 35 U.S.C. 154(b) by 334 days.

(21) Appl. No.: 13/940,705

(22) Filed: Jul. 12, 2013

(65) Prior Publication Data
US 2015/0014255 A1 Jan. 15, 2015

(51) Int. Cl.
*C02F 1/66* (2006.01)
*C02F 1/72* (2006.01)
*C02F 103/36* (2006.01)

(52) U.S. Cl.
CPC .......... *C02F 1/66* (2013.01); *C02F 1/725* (2013.01); *C02F 2103/365* (2013.01); *C02F 2301/043* (2013.01)

(58) Field of Classification Search
CPC .... C02F 1/66; C02F 1/725; C02F 1/72; C02F 2301/043; C02F 2301/04; C02F 2103/365; C02F 2103/36; C02F 2103/34; B01D 17/0214; B01D 17/0208; B01D 17/02
USPC ....... 210/724, 723, 702, 761, 758, 749, 763, 210/199, 198.1, 542, 539, 512.1, 511; 423/567.7, 511, 576.2; 208/230, 226, 208/208 R, 177; 588/318, 313
See application file for complete search history.

(56) References Cited

U.S. PATENT DOCUMENTS

| | | | |
|---|---|---|---|
| 2,059,075 A * | 10/1936 | Yabroff et al. | 208/227 |
| 2,331,034 A | 10/1943 | Lazar et al. | |
| 2,434,095 A | 1/1948 | Ayers | |
| 2,617,833 A | 11/1952 | Kalichevsky et al. | |
| 2,872,486 A | 2/1959 | Gilbert et al. | |
| 4,347,225 A | 8/1982 | Audeh et al. | |
| 4,818,410 A * | 4/1989 | Bellos | B01D 17/0205 210/639 |
| 5,439,592 A * | 8/1995 | Bellos | B01D 17/085 210/639 |
| 5,705,074 A * | 1/1998 | Brient | 210/634 |
| 5,997,731 A | 12/1999 | Suarez | |
| 6,180,079 B1 | 1/2001 | Shimizu | |
| 7,575,689 B1 * | 8/2009 | Panjala et al. | 210/694 |
| 2010/0252500 A1 * | 10/2010 | Kumfer et al. | 210/620 |

(Continued)

*Primary Examiner* — David C Mellon
*Assistant Examiner* — Liam Royce

(57) ABSTRACT

Methods and systems for treating caustic materials are disclosed. In one exemplary embodiment, a method for treating caustic materials includes the steps of providing a first caustic solution stream including phenolic constituents and naphthenic constituents, mixing the first caustic solution stream with an acid solution, and separating phenolic acids from the first caustic solution stream. The method further includes further mixing the first caustic solution stream with additional acid solution and separating naphthenic acids from the first caustic solution stream. Still further, the method includes providing a second caustic solution stream including sulfidic constituents, mixing the first caustic solution stream with the second caustic solution stream to form a combined caustic solution stream, and oxidizing the sulfidic constituents of the combined caustic solution stream.

12 Claims, 2 Drawing Sheets

(56) References Cited

U.S. PATENT DOCUMENTS

2012/0152807 A1* 6/2012 McFarlane ................ 208/208 R
2012/0168352 A1* 7/2012 Cillessen et al. ............ 208/339
2015/0284264 A1* 10/2015 Kumfer .................... C02F 3/00
　　　　　　　　　　　　　　　　　　　　　　　　210/631

* cited by examiner

METHODS AND SYSTEMS FOR TREATING CAUSTIC MATERIALS

TECHNICAL FIELD

The present disclosure generally relates to methods and systems for treating caustic materials. More particularly, the present disclosure relates to methods and systems for treating sulfidic, phenolic, and naphthenic caustic waste flow streams that result from the industrial refining of hydrocarbons.

BACKGROUND

Crude oils predominantly contain hydrocarbons, with sulfur, nitrogen, oxygen, and metals being minor constituents. While it is desirable to recover the hydrocarbon constituents in their pure form, it is difficult to isolate pure products because most of the minor constituents occur in combination with carbon and hydrogen. Separation of impurities such as those listed above generally requires expenditures of valuable resources such as time, chemicals, energy, and money. Therefore, one goal of the petroleum processing industry is to optimize impurity-removal procedures, equipment, and resources in order to eliminate those impurities that have the most degrading effect on the end products.

A common impurity encountered in hydrocarbon processing is sulfur. The presence of sulfur in hydrocarbon products generally increases the corrosive characteristics thereof, and sulfur forms harmful and noxious reaction products upon combustion. Consequently, measures are taken to either reduce the amount of sulfur or to render the sulfur-containing compounds inoffensive. A common method for treating petroleum to reduce the degrading effects of sulfur is chemical processing to "sweeten" sulfur compounds contained in the particular fractions, e.g., mercaptans that are designated by the formula R—SH. "Sweetening" denotes that mercaptan sulfur compounds are converted to less objectionable disulfide compounds, e.g., R—S—S—R, R—S—S—R', etc. One particular process known in the art is the sweetening of petroleum products such as kerosene by the MEROX® process, which is available from UOP LLC of Des Plaines, Ill., USA. MEROX is a proprietary process for the removal of mercaptans from a hydrocarbon stream.

In order to sweeten a petroleum product, a caustic solution, such as sodium hydroxide or potassium hydroxide, is generally first used to convert the mercaptan compounds to the ionic state, $RS^-$. The caustic solution is also helpful in that it removes naphthenic acids and other organic acids in general such as phenolic acids, and other sulfur compounds from refined petroleum products and petroleum distillate. Unfortunately, since caustic solutions are quite harmful to organic tissue, extreme care must be taken in the use and disposal of caustic solutions in order to protect the waterways, rivers, subterranean water formations, and, in many places, the oceans and surrounding seas of industrial refining areas from caustic pollution. This presents a significant problem to the refining industry because of the great volume of caustic solutions used in petroleum processing and because all of the solutions used must eventually be discarded as a non-regenerative caustic solution or as the spent liquor resulting from a regenerative process.

To date, the industry generally uses two methods to dispose of spent caustic materials—neutralization and incineration, with incineration being a relatively new trend in waste caustic liquor disposal. Incineration disposal presents certain disadvantages, however. For example, the cost of operation of the incinerator units is high because of the energy required to maintain the elevated temperatures necessary to maintain combustion of the predominantly aqueous solution of alkaline waste. Commercial units presently in operation make use of the combustion of fuel oil and natural gas to sustain the evaporation of the aqueous parts of the waste liquor and then furnish mostly carbon dioxide, $CO_2$, to form the innocuous carbonates of sodium or other alkali metals for disposal. Refined fuel oil and natural gas are very expensive for use in disposing of the volumes of caustics discarded as a result of petroleum processing and they are both very valuable commodities in terms of consumer-useable energy sources. As such, neutralization remains a desirable alternative to incineration.

Accordingly, it is desirable to provide systems and methods for treating caustic materials that do not primarily rely on the combustion of fuel oil or natural gas. It is further desirable to provide such systems and methods that neutralize the caustic materials to an acceptable level for disposal. Furthermore, other desirable features and characteristics of the present disclosure will become apparent from the subsequent detailed description and the appended claims, taken in conjunction with the accompanying drawings and this background of the disclosure.

BRIEF SUMMARY

Apparatuses and methods for treating caustic materials are disclosed. In one exemplary embodiment, a method for treating caustic materials includes the steps of providing a first caustic solution stream including phenolic constituents and naphthenic constituents. The first caustic solution stream has a pH greater than about 7.0. The method further includes mixing the first caustic solution stream with an acid solution to reduce the pH of the first caustic solution stream to a pH of about 3.5 to about 4.5, thereby chemically transforming the phenolic constituents of first caustic solution stream to phenolic acids, and separating the phenolic acids from the first caustic solution stream. The method further includes further mixing the first caustic solution stream with additional acid solution to reduce the pH of the first caustic solution stream to a pH of about 1.5 to about 2.5, thereby chemically transforming the naphthenic constituents of the first caustic solution stream to naphthenic acids, and separating the naphthenic acids from the first caustic solution stream. The method further includes providing a second caustic solution stream including sulfidic constituents. The second caustic solution stream has a pH greater than about 7.0. The method further includes mixing the first caustic solution stream with the second caustic solution stream to form a combined caustic solution stream. The combined caustic solution stream has a pH that is more neutral than either the first or second caustic solution streams individually. Still further, the method includes oxidizing the sulfidic constituents of the combined caustic solution stream.

In another exemplary embodiment, an apparatus for treating caustic materials includes a first caustic solution configured for source containing a first caustic solution. The first caustic solution includes phenolic constituents and naphthenic constituents and has a pH greater than about 7.0. The system further includes an acidification unit configured for containing an acid solution and configured to mix the first caustic solution with the acid solution to reduce the pH of the first caustic solution to a pH of about 3.5 to about 4.5, thereby chemically transforming the phenolic constituents of first caustic solution to phenolic acids. The acidification unit is further configured to further mix the first caustic solution stream with additional acid solution to reduce the pH of the first caustic solution stream to a pH of about 1.5 to about 2.5, thereby chemically transforming the naphthenic constituents of the first caustic solution stream to naphthenic acids. The system further includes a liquid/liquid separation system configured to separate the phenolic acids from the first caustic solution stream at a pH of about 3.5 to about 4.5 and to separate the naphthenic acids from the first caustic solution stream at a pH of about 1.5 to about 2.5. The system further includes a second caustic solution source configured for containing a second caustic solution. The second caustic solution includes sulfidic constituents and has a pH greater than about 7.0. Still further, the system includes a sulfide oxidation unit configured to oxidize the sulfidic constituents of the second caustic solution.

BRIEF DESCRIPTION OF THE DRAWINGS

The caustic material treatment systems and associated methods will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed embodiments. All of the embodiments and implementations of the caustic material treatment systems and associated methods described herein are exemplary embodiments provided to enable persons skilled in the art to make or use the same and not to limit their scope, which is defined by the claims. Furthermore, there is no intention to be bound by any expressed or implied theory presented in the preceding technical field, background, brief summary, or the following detailed description.

Embodiments of the present disclosure are generally directed to methods and systems for treating caustic materials, and in particular phenolic, naphthenic, and sulfidic caustic materials. In the operation of certain embodiments, phenolic and naphthenic caustic materials are provided in a first caustic solution stream and are treated with an acidic solution. As the pH of the phenolic and naphthenic caustic materials is reduced by the acidic solution, phenolic acids are first formed as the pH reaches about 4, and are then separated from the caustic solution. As further acidic solution is added to the caustic solution and the pH reaches about 2, naphthenic acids are formed and are then separated from the caustic solution. Additionally, sulfidic caustic materials are provided in a second caustic solution stream that is mixed with the first, acidified caustic solution stream, with the phenolic and naphthenic components thereof having been removed, in an amount so as to neutralize the sulfidic caustic solution stream to a pH of about 7. Carbon dioxide may optionally be injected into the sulfidic caustic solution stream in embodiments wherein the amount of acidified caustic solution stream is insufficient to reduce the pH to neutral. In other embodiments wherein the amount of acidified caustic stream exceeds the amount required to neutralize the second, sulfidic caustic solution stream, a portion of the acidified caustic stream is bypassed. Thereafter, the neutralized sulfidic caustic stream is further treated in a sulfide oxidation unit to produce a treated caustic product that is suitable for disposal.

Figure 1:
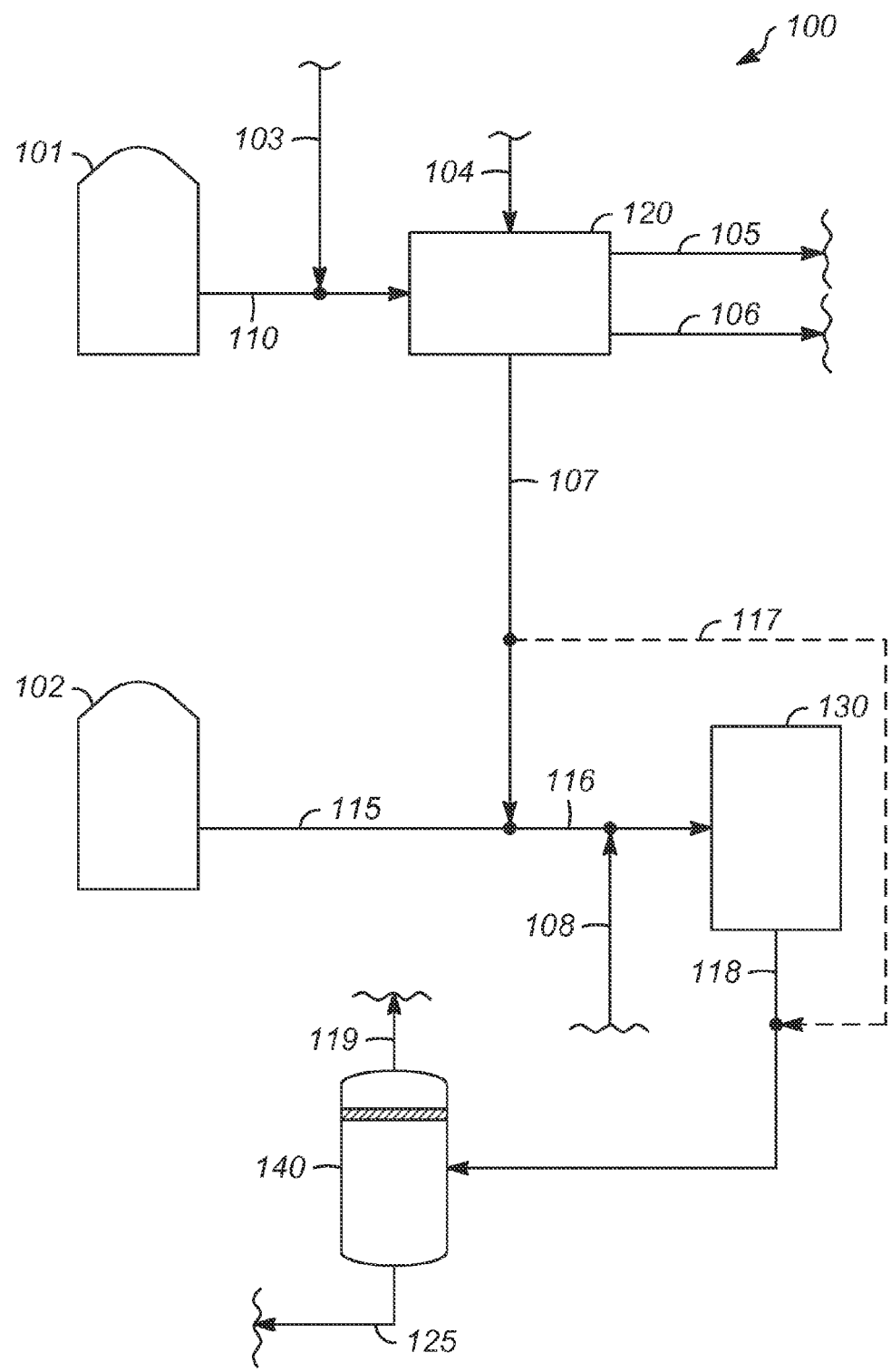
FIG. 1 is a process flow diagram illustrating a method implemented on a caustic material treatment system in accordance with various embodiments of the present disclosure.

FIG. 1 is a process flow diagram illustrating a method implemented on a caustic material treatment system 100 in accordance with various embodiments of the present disclosure. First caustic material source 101 includes a combination of naphthenic and phenolic constituents in a caustic solution, such as an aqueous naphthenic and phenolic caustic solution. As used herein, the term caustic refers to any substance or material which, when in aqueous solution, has a pH value greater than about 7.0, and typically greater than about 10.0, such as greater than about 13.0. An exemplary caustic solution includes one or more of sodium hydroxide, potassium hydroxide, and ammonia. Naphthenic and phenolic caustic solutions are generated from caustic treatment of kerosene and diesel fractions from a naphthenic petroleum product. For example, the treatment of kerosene using the MEROX® kerosene treatment system available from UOP LLC of Des Plaines, Ill., USA produces a naphthenic and phenolic caustic solution containing sodium and potassium hydroxide at a pH of about 13.0 to about 14.0 as a byproduct of the treatment process.

The naphthenic and phenolic caustic solution is directed, via stream 110, from the first caustic material source 101, whereafter it may optionally be combined with a sour water stream 103. As used herein, the term "sour water" refers to wastewater produced during petroleum refining processes that typically includes hydrogen sulfide and ammonia. Like caustic solutions, sour water is typically treated before the water may be reused or sent to a wastewater system. By combining the sour water with the first caustic solution, system 100 more robustly treats a variety of waste streams.

Stream 110, which as noted above includes the naphthenic and phenolic caustic solution, optionally along with the sour water from stream 103, is thereafter directed to an acidification unit 120. Acidification unit 120 is provided with a supply of an acid via stream 104, such as a mineral acid, which may include, for example, hydrochloric acid (HCl) and/or sulfuric acid ($H_2SO_4$), which is combined therein with the naphthenic and phenolic caustic stream 110. The combination of the mineral acid with the naphthenic and phenolic caustic solution in the acidification unit 120 reduces the pH of the caustic solution. Within the acidification unit 120, the acid is added to the caustic solution in an amount such that the caustic solution is reduced to a pH of about 3.5 to about 4.5, such as about 4.0. At a pH of about 3.5 to about 4.5, the phenolic constituents of the solution are chemically transformed into phenolic acids. The phenolic acids are separable from the remainder of the caustic solution by one or more separation methods known in the art, including for example "skimming," which refers to the separation of one or more liquid constituents by differences in specific gravity. As such, in one embodiment, acidification unit 120 is provided with a liquid/liquid separation system, such as a skimming system. The separated phenolic acids may thereafter be removed from the acidification unit 120 via stream 105 for further treatment and/or use in other systems.

After the separation of the phenolic acids from the caustic solution, within the acidification unit 120, a further amount of the acid is added to the caustic solution to further reduce the pH thereof. At a pH of about 1.5 to about 2.5, such as about 1.9 to about 2.0, the naphthenic constituents of the solution are chemically transformed into naphthenic acids. The naphthenic acids are separable from the remainder of the caustic solution by one or more separation methods know in the art, including for example skimming. The previously noted liquid/liquid separation system may be employed therefor. The separated naphthenic acids may thereafter be removed from the acidification unit 120 via stream 106 for further treatment and/or use in other systems. The remaining acidified caustic solution, having the phenolic and naphthenic constituent thereof substantially removed therefrom, and being at a pH about 1.9 to about 2.0, is transferred from the acidification unit 120 via stream 107.

As illustrated in FIG. 1, system 100 further includes a second caustic material source 102 that includes sulfidic constituents in a caustic solution, such as an aqueous sulfidic caustic solution. Sulfidic caustic solutions are generated from caustic treatment of liquefied petroleum gas (LPG) products. For example, the treatment of LPG using the Merox® LPG treatment system available from UOP LLC of Des Plaines, Ill., USA produces a sulfidic caustic solution containing sodium and potassium hydroxide at a pH of about 13.0 to about 14.0 as a byproduct of the treatment process. A typical industrial-scale petroleum refinery will treat kerosene, diesel, and LPG petroleum products, among many other fractions, and as such the phenolic/naphthenic caustic materials (source 101) and the sulfidic caustic materials (source 102) are both typically available for treatment simultaneously at a single refinery installation.

The sulfidic caustic solution is directed, via stream 115, from the second caustic material source 102, whereafter it is combined with the acidified caustic stream 107 from the acidification unit 120. A mixing valve or other known device may be used for this purpose. As noted above, the sulfidic caustic solution has a pH of greater than about 7.0, for example greater than about 10.0 or greater than about 13.0. As such, when combined with the acidified caustic stream 107 (typically at a pH of about 2.0), the combined stream 116 has a pH that is more neutral (i.e., closer to a pH of about 7) than either of the individual streams 107 or 115. However, for purposes of treating the combined stream 116 in a sulfide oxidation unit to render the combined stream 116 suitable for disposal or re-use (as was initially noted above and as will be described in greater detail below), it is desirable to provide the combined stream 116 to the sulfide oxidation unit at a pH as close to neutral as possible, for example a pH of between about 6.5 and about 7.5. Depending on the relative amounts of first and second caustic materials provided to the system 100, which in turn depends on the characteristics and operation of the petroleum refinery system from which such caustic is provided, a full combination of streams 107 and 115 may or may not result in a combined stream 116 that has a substantially neutral pH, i.e. a pH of between about 6.5 and about 7.0, such as about 7.0. For example, if the amount of acidified caustic solution in stream 107 exceeds the amount of sulfidic caustic solution provided via stream 115, the combined stream 116 will tend to be acidic, i.e., below pH 7.0. On the other hand, if the amount of sulfidic caustic solution provided via stream 115 exceeds the amount of acidified caustic solution provided via stream 107, the combined stream 116 will tend to be basic, i.e., above pH 7.0.

In order to address the possible imbalance of material flow in streams 107 and 115, system 100 is further provided with two pH neutralizing sub-systems. The first pH neutralizing sub-system is illustrated in FIG. 1 in connection with carbon dioxide ($CO_2$) gas stream 108, which provides a source of carbon dioxide to combined stream 116. As will be appreciated, the addition of carbon dioxide gas to an aqueous solution results in the formation of carbonic acid ($H_2CO_3$), the presence of which in stream 116 will tend to acidify stream 116. Thus, in instances where the relative amount of material provided by stream 115 exceeds that of stream 107 such that the combined stream 116 has a basic pH, the addition (i.e., injection) of carbon dioxide thereto via line 108 will reduce the pH toward a desirable neutral level, such as between about 6.5 and about 7.5. The amount of carbon dioxide provided via stream 108 is controllable and, in connection with a pH measuring device (not illustrated), the amount of carbon dioxide provided to stream 116 is controlled such that the resulting solution in stream 116 has a pH of between about 6.5 and about 7.5, such as about 7.0.

The second pH neutralizing sub-system is illustrated in FIG. 1 in connection with acidified caustic bypass system, such as an acidified caustic bypass stream 117. In instances where the relative amount of material provided by stream 107 exceeds that of stream 115 such that the combined stream 116 has an acidic pH, the bypass of a portion of stream 107, thus reducing the overall amount of acidified caustic material available for combination with stream 115, will increase the pH of the combined stream toward a desirable neutral level, such as between about 6.5 and about 7.5. The amount of stream 107 that is bypassed is controllable and, in connection with the pH measuring device, the amount of acidified caustic directed into bypass stream 117 is controlled such that the resulting solution in stream 116 has a pH of between about 6.5 and about 7.5, such as about 7.0.

Figure 2:
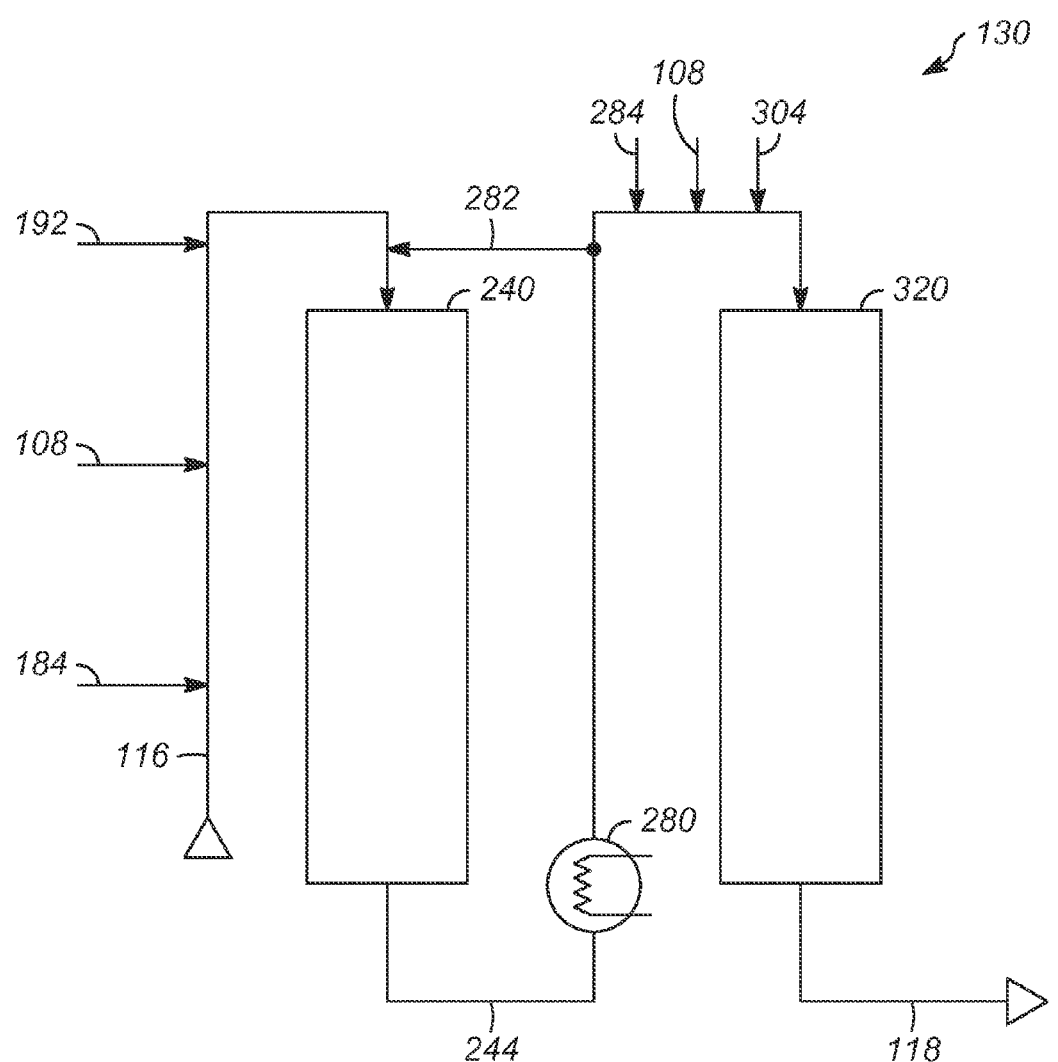
FIG. 2 is a process flow diagram illustrating a method implemented on a sulfide oxidation unit of the caustic material treatment system shown in FIG. 1.

Thereafter, as noted above, the combined stream 116 is directed to sulfide oxidation unit 130 for treating the sulfidic constituents in stream 116. An exemplary sulfide oxidation unit 130 suitable for use in system 100 is described in connection with FIG. 2. As shown therein, sulfide oxidation unit 130 includes a first reactor 240, an inter-stage cooler 280, and a second reactor 320. Within sulfide oxidation unit 130, several streams are added to combined stream 116, including an oxygen-containing stream 184, the carbon dioxide-containing stream 108, and optionally an oxidizing catalyst stream 192.

The first reactor 240 contains an oxidizing catalyst, which may include a metal phthalocycanine catalyst. Such catalyst may include a support and a catalytic component, for example a metal phthalocycanine compound. Examples of a suitable support for metal phthalocyanines are charcoal, such as wood charcoal or bone charcoal, which may or may not be activated prior to use; naturally occurring or synthetically prepared refractory inorganic oxides such as alumina, silica, zirconia, kieselguhr, bauxite, pillared clay, and high silica zeolites; and activated carbons.

Exemplary metal phthalocyanine compounds include those of groups 8-10 of the Periodic Table and vanadium. Other metal phthalocyanine compounds that may be utilized include those of copper, magnesium, titanium, hathium, tantalum, silver, zinc, tin, molybdenum, manganese, or tungsten. An exemplary metal phthalocyanine is a cobalt phthalocyanine compound. Moreover, any suitable derivative of the metal phthalocyanine may be employed including the sulfonated derivatives and the carboxylated derivatives, for example cobalt phthalocyanine monosulfonate, cobalt phthalocyanine disulfonate, or a mixture thereof. The sulfonated derivatives may be prepared, for example, by reacting cobalt, vanadium, or other metal phthalocyanine with fuming sulfuric acid. Further, it will be appreciated that other derivatives, such as carboxylated derivatives, may be employed. Carboxylated derivatives are readily prepared by the action of trichloroacetic acid on the metal phthalocyanine. The amount of the phthalocyanine compound combined with the support may be any catalytically effective amount. Because of the high activity of the metal phthalocyanine catalyst, catalytically effective results are ordinarily obtained when the support includes about 0.001 to about 5%, by weight, of the catalyst, for example about 0.01 to about 2%, by weight, of the catalyst.

In another exemplary embodiment, a solid adsorptive support with a metal chelate may be contacted with a substituted ammonium compound, and thereafter may be heated with the resulting catalyst to a temperature above ambient temperature. The contacting of the solid adsorptive support with the metal chelate and the substituted ammonium compound may be performed concurrently or consecutively. If the contacting is performed consecutively, the solid adsorptive support is contacted first with the metal chelate and thereafter with the substituted ammonium compound. One exemplary substituted ammonium hydroxide is a dimethylbenzylalkylammonium hydroxide.

The solid adsorptive support may be in the form of spheres, pills, pellets, granules, or other suitable regular or irregular size and shape for carrying the metal chelate and substituted ammonium compound. The method of contacting the solid adsorptive support with the metal chelate and the substituted ammonium compound may be dipping, soaking, suspending, or otherwise immersing the solid adsorptive support in solutions or dispersions of the metal chelate and of the substituted ammonium compound, or in a common solution or dispersion of the metal chelate and the substituted ammonium compound. Alternatively, the solutions or dispersions of the metal chelate and of the substituted ammonium compound, of the common solution or dispersion of the metal chelate and the substituted ammonium compound, may be sprayed onto, poured over, or otherwise contacted with the solid adsorbent support. The resulting catalyst may be heated to a temperature above ambient temperature in any conventional or otherwise convenient manner. The temperature to which the resulting catalyst is heated is preferably from about 50° C. to about 200° C., for example from about 90° C. to about 130° C.

An effluent 244 exiting the first reactor 240 is passed through the inter-stage cooler 280. A portion may be recycled as a recycle stream 282 and combined with the feed (i.e., with combined stream 116). The remainder may be combined with an oxygen-containing stream 284, the carbon dioxide stream 108, and a further oxidizing catalyst stream 304. The oxidizing catalyst stream 304 may contain a suitable amount of oxidizing catalyst, as described above. Each of the first reactor 240 and the second reactor 320 may operate, independently, at a temperature of about 25° C. to about 150° C. and a pressure of about 440 KPa to about 1,830 KPa, for example from about 35° C. to about 95° C. and a pressure of about 790 KPa to about 1,480 KPa.

Subsequent to leaving the sulfide oxidation unit 130, a treated caustic stream 118 is combined with the bypass stream 117, if any. As noted above, the bypass stream 117 is provided to ensure that the combined stream 116 entering the sulfide oxidation unit 130 is at a substantially neutral pH. Thereafter, the treated caustic stream 118 is directed to a vent tank 140. Vent tank 140 is provided to allow any gaseous byproducts from the sulfide oxidation process to be vented from treated caustic stream 118 prior to its disposal or reuse. As shown in FIG. 1, a vent gas stream 119 leaves vent tank 140 through an upper portion thereof, while a liquid treated caustic stream 125 leaves vent tank 140 through a bottom portion thereof. The liquid treated caustic stream 125 then exits system 100, whereafter it may be disposed of, or alternately reused in a petroleum refining process or other process. In some embodiments, as shown in FIG. 1, the vent tank 140 includes a coalescer to remove and liquid particles from the gas stream 119.

As such, the present disclosure provides various exemplary embodiments of methods and systems for treating caustic materials that are able to simultaneously treat a full range of caustic materials that may be produced as a result of industrial petroleum refining processes, including phenolic, naphthenic and sulfidic caustic materials. The methods and systems beneficially do not require excessive use of fuel oil or natural gas for their operation. Further, the methods and systems are able to treat varying levels of caustic material flows.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes may be made in the processes without departing from the scope defined by the claims, which includes known equivalents and foreseeable equivalents at the time of this disclosure.

What is claimed is:

1. A method for treating caustic materials comprising the steps of:
   providing a first caustic solution stream comprising phenolic constituents and naphthenic constituents, the first caustic solution stream having a pH greater than about 7.0;
   mixing the first caustic solution stream with an acid solution to reduce the pH of the first caustic solution stream to a pH of about 3.5 to about 4.5, thereby chemically transforming the phenolic constituents of the first caustic solution stream to phenolic acids;
   separating the phenolic acids from the first caustic solution stream to form a first separated caustic solution stream and a phenolic acid stream;
   further mixing the first separated caustic solution stream with an additional acid solution to reduce the pH of the first caustic solution stream to a pH of about 1.5 to about 2.5, thereby chemically transforming the naphthenic constituents of the first caustic solution stream to naphthenic acids;
   separating the naphthenic acids from the first separated caustic solution stream to form a naphthenic acid stream and a first remaining caustic solution stream having a pH of from about 1.5 to about 2.5;
   providing a second caustic solution stream comprising sulfidic constituents, the second caustic solution stream having a pH greater than about 7.0;
   mixing the first remaining caustic solution stream with the second caustic solution stream to form a combined caustic solution stream, the combined caustic solution stream having a pH that is more neutral than either the first remaining caustic solution or the second caustic solution streams individually; and
   oxidizing the sulfidic constituents of the combined caustic solution stream.

2. The method of claim 1, further comprising bypassing a portion of the first remaining caustic solution stream, subsequent to separating the phenolic acids therefrom, but prior to mixing the first remaining caustic solution stream with the second caustic solution stream.

3. The method of claim 2, further comprising rejoining the portion of the first remaining caustic solution stream with the combined caustic solution stream subsequent to oxidizing the sulfidic constituents of the combined caustic solution stream.

4. The method of claim 1, further comprising acidifying the combined solution stream prior to oxidizing the sulfidic constituents of the combined caustic solution stream.

5. The method of claim 4, wherein acidifying the combined solution stream comprises mixing the combined solution stream with a carbon dioxide gas.

6. The method of claim 1, wherein mixing the first caustic solution stream with the acid solution comprises mixing the first caustic solution stream with a mineral acid solution.

7. The method of claim 1, wherein oxidizing the sulfidic constituents of the combined caustic solution stream comprises oxidizing the sulfidic constituents of the combined caustic solution stream at a pH of about 6.5 to about 7.5.

8. The method of claim 1, further comprising venting the combined caustic solution stream subsequent to oxidizing the sulfidic constituents of the combined solution stream.

9. The method of claim 1, wherein separating the phenolic acids from the first caustic solution stream comprises skimming the phenolic acids from the first caustic solution stream.

10. The method of claim 1, wherein separating the naphthenic acids from the first separated caustic solution stream comprises skimming the naphthenic acids from the first separated caustic solution stream.

11. A method for treating caustic materials comprising the steps of:

providing a first caustic solution stream comprising phenolic constituents and naphthenic constituents from a first caustic solution source, the first caustic solution stream having a pH greater than about 10.0;

mixing the first caustic solution stream with an acid solution in an acidification unit to reduce the pH of the first caustic solution stream to a pH of about 3.5 to about 4.5, thereby chemically transforming the phenolic constituents of first caustic solution stream to phenolic acids;

separating the phenolic acids from the first caustic solution stream using a liquid/liquid separation system associated with the acidification unit to form a first separated caustic solution stream and a phenolic acid stream;

further mixing the first separated caustic solution stream with an additional acid solution in the acidification unit to reduce the pH of the first caustic solution stream to a pH of about 1.5 to about 2.5, thereby chemically transforming the naphthenic constituents of the first caustic solution stream to naphthenic acids;

separating the naphthenic acids from the first separated caustic solution stream using the liquid/liquid separation system to form a naphthenic acid stream and a first remaining caustic solution stream having a pH from about 1.5 to about 2.5;

providing a second caustic solution stream comprising sulfidic constituents from a second caustic solution source, the second caustic solution stream having a pH greater than about 10.0;

mixing the first remaining caustic solution stream with the second caustic solution stream using a mixing valve to form a combined caustic solution stream, the combined caustic solution stream having a pH that is more neutral than either the first remaining caustic solution or second caustic solution streams individually;

if the pH of the combined caustic solution stream is greater than about 7.5, acidifying the combined solution stream by injecting an acidifying gas into the combined caustic solution stream;

if the pH of the combined caustic solution stream is less than about 6.5, bypassing a portion of the first remaining caustic solution stream, subsequent to separating the phenolic acids therefrom, but prior to mixing the first remaining caustic solution stream with the second caustic solution stream;

if the pH of the combined caustic solution stream is less than about 7.5 and greater than about 6.5 the pH is not adjusted; and oxidizing the sulfidic constituents of the combined caustic solution stream in a sulfide oxidation unit.

12. The method of claim 11, further comprising mixing a sour water stream with the first caustic solution stream prior to mixing the first caustic solution stream with the acid solution in the acidification unit.

* * * * *